(12) United States Patent
Stegmaier

(10) Patent No.: US 12,515,762 B2
(45) Date of Patent: Jan. 6, 2026

(54) METHOD FOR PREDICTING THE POINT IN TIME OF A FUTURE EXTREME VALUE IN A TORQUE CURVE OF A VEHICLE

(71) Applicant: Robert Bosch GmbH, Stuttgart (DE)

(72) Inventor: Juergen Stegmaier, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 18/533,965

(22) Filed: Dec. 8, 2023

(65) Prior Publication Data

US 2024/0208610 A1    Jun. 27, 2024

(30) Foreign Application Priority Data

Dec. 21, 2022 (DE) .................. 10 2022 214 173.3

(51) Int. Cl.
| | | |
|---|---|---|
| *B62M 25/08* | (2006.01) | |
| *B62J 45/411* | (2020.01) | |
| *B62J 45/412* | (2020.01) | |
| *B62M 6/50* | (2010.01) | |

(52) U.S. Cl.
CPC ............ *B62M 25/08* (2013.01); *B62J 45/411* (2020.02); *B62J 45/412* (2020.02); *B62M 6/50* (2013.01)

(58) Field of Classification Search
CPC ........ B62M 25/08; B62M 6/50; B62M 9/133; B62M 9/123; B62J 45/411; B62J 45/412; B62J 45/413
See application file for complete search history.

(56) References Cited

U.S. PATENT DOCUMENTS

| | | | |
|---|---|---|---|
| 5,027,303 A | | 6/1991 | Witte |
| 5,658,219 A | * | 8/1997 | Kondo ................ F16H 61/0248 |
| | | | 477/142 |
| 10,875,604 B2 | * | 12/2020 | Fujimoto ............... B62J 45/413 |
| 11,345,441 B2 | * | 5/2022 | Hamed ................... B62M 25/08 |
| 11,352,097 B2 | * | 6/2022 | Keppens ................ B62M 11/14 |
| 11,999,442 B2 | * | 6/2024 | Hahn ...................... B62M 6/50 |
| 2021/0061414 A1 | | 3/2021 | Fujimoto et al. |
| 2022/0119074 A1 | | 4/2022 | Baumgaertner et al. |
| 2022/0119075 A1 | * | 4/2022 | Hamed .................. B62M 9/122 |
| 2023/0303208 A1 | * | 9/2023 | Manewald .............. B62M 6/55 |

FOREIGN PATENT DOCUMENTS

| | | |
|---|---|---|
| CN | 1078554 A | 11/1993 |
| DE | 102 43 751 A1 | 6/2003 |
| DE | 10 2013 201 101 A1 | 7/2014 |
| DE | 10 2014 206 818 A1 | 10/2015 |
| DE | 10 2022 123 362 A1 | 3/2023 |
| DE | 10 2022 102 070 A1 | 8/2023 |

* cited by examiner

*Primary Examiner* — Richard M Camby
(74) *Attorney, Agent, or Firm* — Maginot, Moore & Beck LLP

(57) ABSTRACT

A method for predicting a point in time of a future extreme value in a torque curve of a vehicle, in particular a single-track vehicle such as an E-bike includes (i) ascertaining a torque value at several points in time, (ii) determining an extreme value of the ascertained torque values at any point in time, (iii) measuring an elapsed time and/or an angle travelled by a pedal of the vehicle since the point in time at which the extreme value was determined, (iv) ascertaining a period duration of the torque curve, and (v) predicting at least one point in time of a future extreme value based on the ascertained period duration and the measured time and/or the angle travelled.

16 Claims, 4 Drawing Sheets

METHOD FOR PREDICTING THE POINT IN TIME OF A FUTURE EXTREME VALUE IN A TORQUE CURVE OF A VEHICLE

This application claims priority under 35 U.S.C. § 119 to patent application no. DE 10 2022 214 173.3, filed on Dec. 21, 2022 in Germany, the disclosure of which is incorporated herein by reference in its entirety.

The disclosure relates to a method for predicting a point in time of a future extreme value in a torque curve of a vehicle, in particular a single-track vehicle such as an E-bike.

The disclosure also relates to a method for shifting a transmission of a vehicle, in particular a single-track vehicle such as an E-bike.

The disclosure also relates to a vehicle, in particular a single-track vehicle such as an E-bike.

Although generally applicable to signal curves, the following disclosure is explained with reference to torque curves in E-bikes.

BACKGROUND

E-bikes comprise an assistance drive that amplifies the torque exerted by a rider on the E-bike and thus supports the rider during the journey.

The E-bikes can be equipped with a transmission, in particular an electric or automatic transmission. The automatic transmission automatically changes gear depending on the torque or speed applied. If a driver generates a high torque during the shifting process, which is further amplified by the drive unit, the resulting torque can lead to impairment or friction in the transmission. The same applies to manual transmissions if the driver generates a high torque during the shifting process.

SUMMARY

In one embodiment, the present disclosure provides a method for predicting a point in time of a future extreme value in a torque curve of a vehicle, in particular a single-track vehicle such as an E-bike, comprising the steps of:
  ascertaining a torque value at several points in time,
  determining an extreme value of the ascertained torque values at any point in time,
  measuring an elapsed time and/or an angle travelled by a pedal of the vehicle since the point in time at which the extreme value was determined,
  ascertaining a period duration of the torque curve, and
  predicting at least one point in time of a future extreme value based on the ascertained period duration and the measured time and/or the angle travelled.

In one embodiment, the present disclosure provides a method for shifting a transmission of a vehicle, in particular a single-track vehicle such as an E-bike, comprising the steps of:
  predicting a point in time at which a torque applied to the vehicle is minimized by a method according to the description below, and
  shifting the vehicle's transmission at the predicted point in time.

In one embodiment, the present disclosure provides a vehicle, in particular a single-track vehicle such as an E-bike, to which a torque can be applied by a rider so that a regular torque curve is produced, comprising:
  a torque sensor designed to ascertain a torque value at several points in time,
  a determination device designed to determine an extreme value of the ascertained torque values,
  a measuring device adapted to measure an elapsed time and/or an angle travelled by a pedal of the vehicle since the point in time at which the extreme value has been determined,
  an ascertaining device designed to ascertain a period duration of the torque curve,
  a predicting device designed to predict at least one point in time of a future extreme value on the basis of the ascertained period duration and the measured time and/or the angle travelled.

One of the advantages of this is that the next possible point in time at which a minimum torque is generated by the driver can be easily calculated. Another advantage is that the calculation can be carried out quickly and efficiently. Another advantage is that both maxima and minima of the torque can be predicted.

The term "extreme value" is to be understood in the broadest sense and refers, in particular in the claims, preferably in the description, to a value in a curve, for example a torque curve, which is the smallest or the largest value within a certain time window. In particular, the extreme values are the maxima and minima, i.e., the peaks and troughs, of a sinusoidal curve in which the rate of change of the curve is approximately zero.

The term "period duration" is to be understood in the broadest sense and refers, in particular in the claims, preferably in the description, to the time required for a pedal of the vehicle to complete a full revolution. In particular, a torque curve of the pedals has two peaks and two troughs during the period duration, as a minimum torque is generated at the top and bottom dead center of the pedals.

Further features, advantages, and additional embodiments of the disclosure are described hereinafter or will be made obvious thereby.

According to an advantageous further development of the disclosure, the angle travelled by the pedal of the vehicle is measured and/or the period duration is ascertained by means of a speed sensor. With a regular torque curve, successive extreme values are each offset by half a period duration of the curve or half a rotation of the pedals. This means that the period duration can be used to determine the next extreme value. The period duration and/or the angle travelled can be determined using a speed sensor, as the period duration corresponds to the inverse of the speed and the angle travelled corresponds to the integral of the speed over time. One advantage of this is that the period duration and the angle travelled can be easily determined.

According to an advantageous further development of the disclosure, the elapsed time is measured using a timer, wherein the timer is reset when a new extreme value is determined. A timer, for example, can be used to measure the time since the last extreme value. This is reset each time a new extreme value is determined. This means that the timer always displays the time since the last specific extreme value. One advantage of this is that the time can be determined efficiently.

According to an advantageous further development of the disclosure, the period duration is ascertained by comparing the points in time of two specific extreme values. If two or more extreme values have already been determined, the period duration can be determined on this basis, as two identical extreme values—i.e., two minima or two maxima—occur offset by half a period duration in a periodic signal. One advantage of this is that the period duration can be determined without a speed sensor.

According to an advantageous further development of the disclosure, the prediction of the at least one point in time of the future extreme value only takes place if the measured time is greater than a threshold value. It is possible that several new extreme values are ascertained within short time intervals when determining the extreme value, as the torque increases or decreases continuously. In addition, localized extreme values can occur in the torque curve due to irregularities in the driving process. In this case, predicting can be suspended until an extreme value is determined that will not be replaced for a certain period of time and is therefore highly likely to be a true minimum or maximum. One advantage of this is that unnecessary calculations to predict the next point in time can be minimized. It can also be assumed that a potential extreme value is clearly an extreme value if the time elapsed since the extreme value was measured is greater than the threshold value. This means that the time counter can be reset from this point in time and the next extreme value can be searched for.

According to an advantageous further development of the disclosure, to determine the extreme value it is checked whether a currently ascertained torque value is greater or less than a current extreme value. The applied torque can be measured continuously. If, for example, a minimum torque is to be ascertained, the current minimum can be saved. Each newly ascertained torque value is then compared with the current minimum. If the torque value is less than the current minimum, this torque value is set as the new minimum. In this way, an extreme value can be determined quickly.

According to an advantageous further development of the disclosure, the points in time of the next and the next but one extreme value are predicted. One advantage of this is that the next but one point in time can be used if an action, such as shifting the transmission, cannot be carried out until the next possible extreme value because there is not enough time.

According to an advantageous further development of the disclosure, the vehicle comprises a shifting device which is designed to shift a transmission of the vehicle at a point in time at which the predicting device has predicted a minimum. One advantage of this is that the vehicle is shifted at a point in time when the torque generated by the driver is minimized.

Further important features and advantages arise from the disclosure including the drawings, and the accompanying description of the drawings.

It is understood that the features specified hereinabove and the features yet to be explained hereinafter can be used not only in the respectively specified combination, but also in other combinations, or alone, without departing from the scope of the present disclosure.

BRIEF DESCRIPTION OF THE DRAWINGS

Preferred designs and embodiments of the present disclosure are illustrated in the drawings and explained in greater detail in the subsequent description.

Shown in schematic form are.

DETAILED DESCRIPTION

Figure 1:
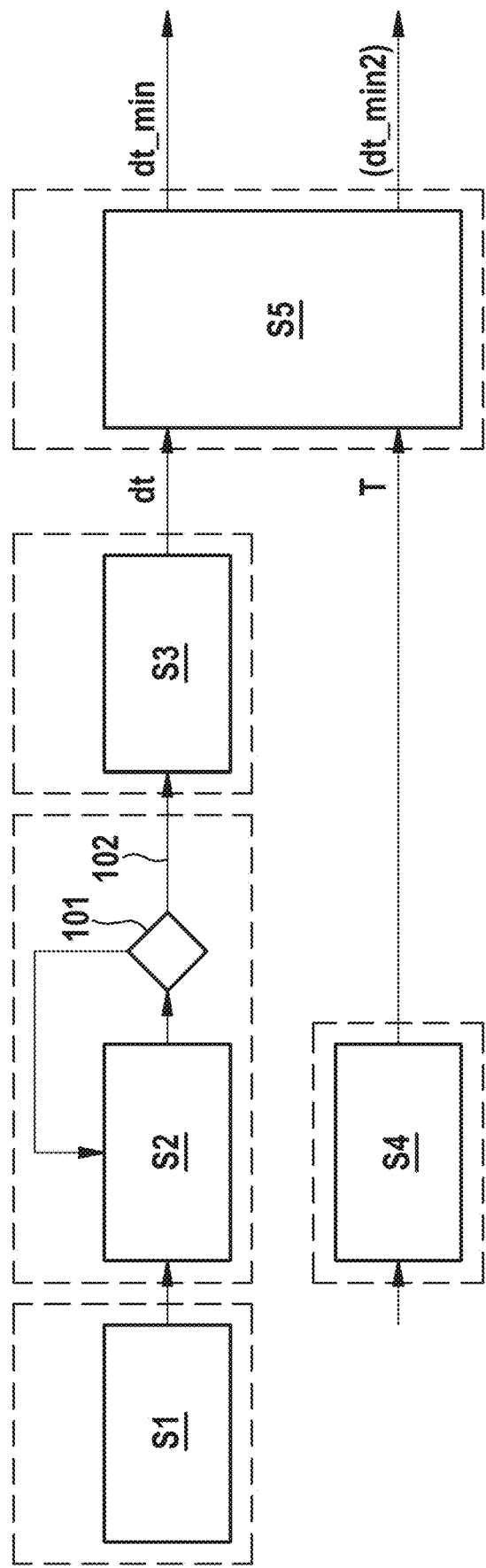
FIG. 1 is a flow chart showing the steps of a method according to one embodiment of the present disclosure.

FIG. 1 shows in schematic form a flow chart with steps of a method according to one embodiment of the present disclosure.

In a first step S1, a torque value is ascertained at several points in time. For example, the torque values can be ascertained using a torque sensor. The torque values correspond to the torque applied by a driver to the pedals of the vehicle. By measuring the torque at several points in time, a curve of torque values can be generated.

In a further step S2, an extreme value of the ascertained torque values is determined at each point in time. For example, a minimum torque value is determined. To do this, the last torque value ascertained is compared with the current minimum and if the last torque value ascertained is less than the current minimum, this torque value becomes the new minimum. As the pedaling torque of a rider is approximately sinusoidal due to the pedal movement, the extreme values within the torque curve can be determined in this way.

In a further step S3, the elapsed time and/or an angle travelled by a pedal of the vehicle since the point in time at which the extreme value was determined is measured. For example, a timer that continuously counts the seconds is used for this purpose. A decision 101 is made for this in step S2. Whenever a new extreme value is determined in step S2, the timer is reset 102. In this way, the elapsed time since the last extreme value ascertained is always determined. Alternatively or additionally, the angle travelled by a pedal of the vehicle can be determined in step S3 by means of a speed sensor. For this purpose, the current speed of the pedals is measured and the measured values are integrated over time. Determining the angle travelled is particularly advantageous if the speed of the pedals is not constant but transient. The angle travelled can be reset in the same way as the elapsed time whenever a new extreme value is determined.

In a further step S4, the period duration of the torque curve is ascertained. The period duration can be determined using the speed sensor, for example, as the period duration corresponds to the inverse of the speed. It is also possible for the period duration to be determined on the basis of ascertained extreme values. The sinusoidal torque curve generated by the pedals has two maxima and two minima per revolution of the pedals, i.e., two upper and two lower extreme values. The period length therefore corresponds to twice the time between two successive maxima or minima.

In a further step S5, at least one point in time of a future extreme value is predicted on the basis of the ascertained period duration and the measured time and/or the angle travelled. The torque curve has two minima and two maxima per period duration. The point in time at which the next minimum or the next maximum of the torque curve will occur can therefore be estimated using the following formula:

$$dt_{min} = \frac{T}{2} - dt$$

where:

$dt_{min}$: is the time until the next extreme value (for example, minimum)

dt: is the elapsed time since the last extreme value

It is also possible to estimate the next but one extreme value if more time is required:

$$dt_{min2} = T - dt$$

where:

$dt_{min2}$: is the time until the next but one extreme value (for example, minimum)

It is also possible for the point in time of the next extreme value to be calculated based on the angle travelled by the pedal, using the formula:

$$dt_{min} = \frac{T}{2} - \varphi * T$$

where:

φ: is the angle travelled by a pedal since the last extreme value

It is possible for the calculation of the point in time of the next possible extreme value to be suspended as long as the elapsed time since the last extreme value is less than a threshold value. This prevents local extremes from being used for the time calculation. For example, it may be required that the elapsed time must be at least 50 ms, preferably at least 100 ms, in particular at least 200 ms. It is also possible that the elapsed time must have reached at least one sixth of the period duration, preferably one quarter of the period duration, in particular at least one third of the period duration.

Figure 2:
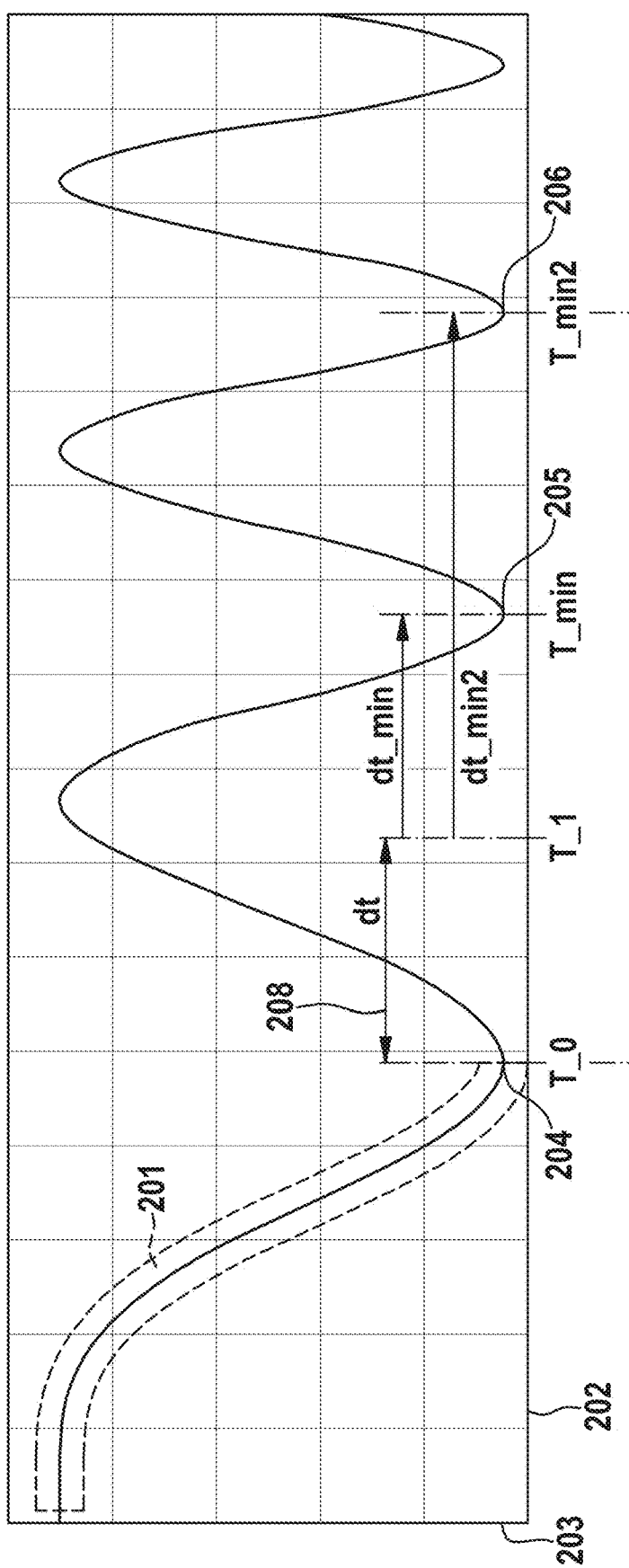
FIG. 2 shows a torque curve according to an embodiment of the present disclosure.

FIG. 2 shows a schematic diagram of a torque curve according to one embodiment of the present disclosure.

Shown is a curve 201 of a torque generated by a driver of a single-track vehicle. The X-axis 202 shows the time in seconds and the Y-axis 203 shows the torque in Nm. Initially, the torque 201 decreases until it reaches a minimum 204 at point in time T_0. The next minimum 205 is therefore expected after half a period duration 207 at point in time T_min and the next but one minimum 206 after a whole period duration 207 at point in time T_min2.

However, at point in time T_0 of minimum 204, it is not yet clear that minimum 204 is actually the global minimum and not a local minimum. For this reason, a timer is started which is reset each time a new minimum is found. At point in time T_0 of minimum 204, the timer is therefore reset one last time and counts the seconds since point in time T_0. As soon as a threshold value 208 of time is exceeded, it is clear that the minimum 204 is actually the global minimum. The threshold value 208 here corresponds to a quarter of the period duration 207.

In this way, the point in time T_min of the next minimum 205 can be determined at any point in time T_1—in FIG. 2, T_1 is the point in time at which the threshold value 208 is exceeded, for example. This is expected after half a period length 207 minus the time dt that has already elapsed since the point in time T_0 of the minimum 204. The elapsed time dt corresponds to the difference T_1–T_0. Similarly, the next but one minimum 206 is expected after an entire period duration 207 minus the time dt that has already elapsed. This means that dt_min time remains until the next minimum torque 205 and dt_min2 time remains until the next but one minimum 206.

Figure 3:
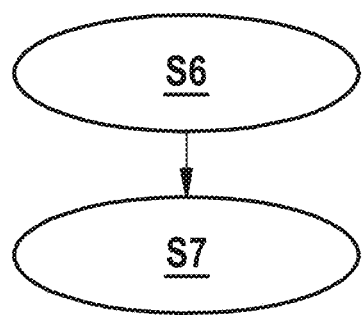
FIG. 3 shows steps of a method according to an embodiment of the present disclosure, and FIG. 4 a vehicle according to an embodiment of the present disclosure.

FIG. 3 shows in schematic form steps of a method according to one embodiment of the present disclosure.

The method shown in FIG. 2 can be used to optimize the gear shifting of a vehicle transmission.

For this purpose, step S6 predicts a point in time at which the torque applied to the vehicle is minimized. The point in time can be ascertained in particular according to steps S1 to S5 as shown in FIG. 1.

In a further step S7, the vehicle's transmission is shifted at the predicted point in time.

It is also conceivable that a maximum is predicted and that the vehicle is not shifted at the predicted point in time, but only after and/or before, so that the torque applied is lower.

Figure 4:
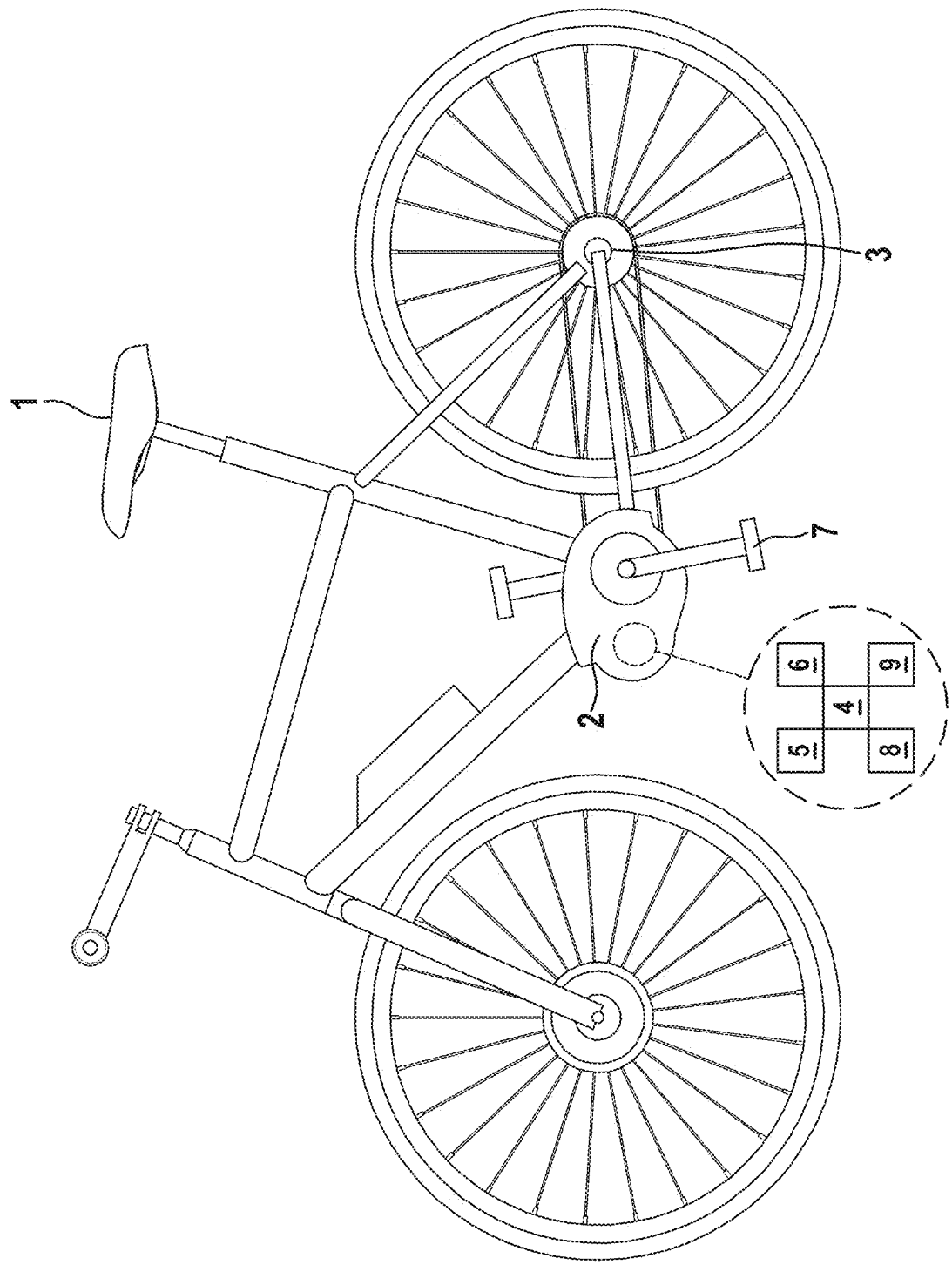

FIG. 4 shows in schematic form a vehicle according to one embodiment of the present disclosure.

Shown is a vehicle 1, here in the form of an E-bike, with a drive unit 2 and a transmission 3. The transmission 3 can be an automatic transmission and/or an electrically shiftable transmission. The vehicle 1 can be used to determine a point in time at which the transmission 3 can be shifted, as a minimum torque is expected to be present at this point in time. For this purpose, vehicle 1 has:

a torque sensor 4, designed to ascertain a torque value at several points in time, a determination device 5, designed to determine an extreme value of the ascertained torque values, a measuring device 6 adapted to measure an elapsed time and/or an angle travelled by a pedal 7 of the vehicle 1 since the point in time at which the extreme value has been determined, an ascertaining device 8, designed to ascertain a period duration of the torque curve, a predicting device 9, designed to predict at least one point in time of a future extreme value on the basis of the ascertained period duration and the measured time and/or the angle travelled.

In particular, the vehicle is designed to perform steps S1 through S5 as shown in FIG. 1. The vehicle is also designed to carry out steps S6 through S7 as shown in FIG. 2.

In summary, at least one of the embodiments of the disclosure has at least one of the following advantages and/or at least one of the following features:

Determining a point in time at which an applied torque will be minimal.

Simple and efficient calculation of the point in time.

Wear-reduced shifting of a vehicle.

Although the present disclosure has been described with reference to preferred exemplary embodiments, it is not limited thereto and can instead be modified in a variety of ways.

What is claimed is:

1. A method for predicting a point in time of a future extreme value in a torque curve of a vehicle, comprising:
   ascertaining a torque value at several points in time;
   determining an extreme value of the ascertained torque values at each point in time;
   measuring an elapsed time and/or an angle travelled by a pedal of the vehicle since the point in time at which the extreme value has been determined;
   ascertaining a period duration of the torque curve; and
   predicting at least one point in time of a future extreme value on the basis of the ascertained period duration and the measured time and/or the angle travelled.

2. The method according to claim 1, wherein the measurement of the angle travelled by the pedal of the vehicle and/or the ascertaining of the period duration is carried out by way of a speed sensor.

3. The method according to claim 1, wherein:
   the measuring of the elapsed time is performed using a timer, and
   the timer is reset when a new extreme value is determined.

4. The method according to claim 1, wherein the period duration is determined based on a comparison of the points in time of two ascertained extreme values.

5. The method according to claim 1, wherein the predicting of the at least one point in time of the future extreme value is performed only when the measured time is greater than a threshold value.

6. The method according to claim 1, wherein determining the extreme value includes checking whether a currently ascertained torque value is greater than or less than a current extreme value.

7. The method according to claim 1, wherein the points in time of the next and the next but one extreme value are predicted.

8. A method for shifting a transmission of a vehicle, comprising:
predicting a point in time at which a torque applied to the vehicle is minimized by a method according to claim 1, and
shifting the transmission of the vehicle at the predicted point in time.

9. A vehicle to which a torque can be applied by a rider so that a regular torque curve is produced, comprising:
a torque sensor designed to ascertain a torque value at several points in time;
a determination device configured to determine an extreme value of the ascertained torque values;
a measuring device configured to measure an elapsed time and/or an angle travelled by a pedal of the vehicle since the point in time at which the extreme value has been determined;
an ascertaining device designed to ascertain a period duration of the torque curve; and
a predicting device designed to predict at least one point in time of a future extreme value on the basis of the ascertained period duration and the measured time and/or the angle travelled.

10. The vehicle according to claim 9, further comprising a shifting device configured to shift a transmission of the vehicle at a point in time when the predicting device has predicted a minimum.

11. The method according to claim 1, wherein the vehicle is a single-track vehicle.

12. The method according to claim 11, wherein the single-track vehicle is an E-bike.

13. The method according to claim 8, wherein the vehicle is a single-track vehicle.

14. The method according to claim 13, wherein the single-track vehicle is an E-bike.

15. The vehicle according to claim 9, wherein the vehicle is a single-track vehicle.

16. The vehicle according to claim 15, wherein the single-track vehicle is an E-bike.

\* \* \* \* \*